United States Patent
Bashan et al.

(10) Patent No.: US 7,930,918 B2
(45) Date of Patent: Apr. 26, 2011

(54) FOB HAVING A CLIP AND METHOD FOR MANUFACTURE THEREOF

(75) Inventors: Oded Bashan, Rosh Pina (IL); Aharon Binur, Beit Hillel (IL); Chen Zahavi, Misgav (IL)

(73) Assignee: On Track Innovations Ltd., Rosh Pina (IL)

( * ) Notice: Subject to any disclaimer, the term of this patent is extended or adjusted under 35 U.S.C. 154(b) by 617 days.

(21) Appl. No.: 11/994,282

(22) PCT Filed: Dec. 18, 2006

(86) PCT No.: PCT/IL2006/001452
§ 371 (c)(1),
(2), (4) Date: Dec. 28, 2007

(87) PCT Pub. No.: WO2008/059473
PCT Pub. Date: May 22, 2008

(65) Prior Publication Data
US 2010/0107710 A1    May 6, 2010

(30) Foreign Application Priority Data

Nov. 12, 2006 (IL) .......................................... 179187

(51) Int. Cl.
*A44B 15/00* (2006.01)
(52) U.S. Cl. ........................................ 70/456 R; 70/408
(58) Field of Classification Search ........ 70/456 R–459, 70/408
See application file for complete search history.

(56) References Cited

U.S. PATENT DOCUMENTS

| 3,384,695 A |   | 5/1968  | Murray |
|---|---|---|---|
| 4,079,607 A | * | 3/1978  | Spruyt ........................ 70/456 R |
| 4,166,489 A | * | 9/1979  | Lemelson .................... 206/38.1 |
| 4,209,558 A | * | 6/1980  | Fayal .............................. 428/28 |
| 4,474,043 A | * | 10/1984 | Morrone, III ............... 70/456 R |
| 5,181,605 A | * | 1/1993  | Bishop et al. ................ 206/37.1 |

(Continued)

FOREIGN PATENT DOCUMENTS

DE 4226341 A1 2/1994

OTHER PUBLICATIONS

International Search Report dated Jul. 5, 2007.

*Primary Examiner* — Suzanne D Barrett
(74) *Attorney, Agent, or Firm* — Browdy and Neimark, PLLC

(57) ABSTRACT

A fob (10) such as a key fob has a casing (11) and a resilient clip (12) abutting the casing at a first end of the clip and overhanging the casing to form a substantially J-shaped clip. The casing may be substantially rectangular in shape and may includes a recess for accommodating therein an insert such as a electronic circuit (13) and a cover mounted (16) within the recess so as to overlay the electronic circuit and form a peripheral recess (18) between a rim (19) of the casing and a peripheral edge of the cover that may be hermetically sealed to form a sealed unit. During manufacture, the fob is injection molded wherein the resilient clip abuts the casing at a first end of the clip while lying outside a boundary of the casing. Local heat is then applied to the clip and the clip is bent so that it overhangs the casing.

12 Claims, 3 Drawing Sheets

U.S. PATENT DOCUMENTS

| | | |
|---|---|---|
| 5,592,767 A | 1/1997 | Treske |
| 6,016,676 A * | 1/2000 | McConnell ..................... 70/408 |
| 7,350,385 B1 * | 4/2008 | Book .......................... 70/456 R |
| 7,499,283 B2 * | 3/2009 | De Los Santos et al. ..... 361/752 |
| 2003/0101630 A1 | 6/2003 | Garcia et al. |
| 2003/0206409 A1 | 11/2003 | Parsons et al. |
| 2007/0227866 A1 * | 10/2007 | Dimig ....................... 200/302.2 |

* cited by examiner

FOB HAVING A CLIP AND METHOD FOR MANUFACTURE THEREOF

FIELD OF THE INVENTION

This invention relates to the manufacture of a fob having a clip for attaching the fob to a key ring and/or clipping the fob into a pocket or the like.

BACKGROUND OF THE INVENTION

Key fobs are decorative items or other accessories that are attached to a key ring. The present invention relates particularly to a plastic key fob that accommodates an electronic chip as used in smart cards and may serve for a variety of applications, such as personal ID, access control, electronic purse, credit/debit cards and the like. Fobs are commonly provided with an aperture allowing the fob to be supported on a key ring. However, the plastic fob of the kind with which the present invention is concerned has, instead of an aperture, a generally J-shaped clip that serves to attach the fob quickly and removably to a key ring, either directly or via a key chain. The clip also serves to clip the fob into a user's pocket similar to a pen clip. To this end, the clip is formed of a resilient material that overhangs a casing of the fob and whose end, in its normal state, substantially touches the fob's casing. When inserted into a user's pocket, the end of the clip is thus resiliently pushed away from the casing by the material of the pocket so as to grip the pocket.

The clip is an integral part of the fob's casing and is required to be formed as a composite injection molded unit. However, the requirement that the clip overhang the fob's casing militates against its being formed by injection molding, since it is clearly impossible to mold the casing with the clip in situ.

U.S. Pat. No. 5,592,767 (Treske) discloses a durable holder for retaining and displaying cards. When the holder is manufactured from opaque materials, an inserted card is readily displayed to viewers without requiring removal of the card. The holder includes a clip for securing the holder to an object quickly and efficiently. A second clip may be secured to the first clip thereby further allowing the holder to be alternately attached to other articles.

US 2003/101630 (Garcia et al.) discloses a one-piece, injection-molded identification badge holder wherein the need for component assembly or multiple molding steps during manufacturing are eliminated. The product has at least one detachable, interchangeable fastener that may be connected to a base plate to allow a user to display the holder in a vertical or horizontal position as desired.

US 2003/206409 (Parsons et al.) discloses a method and apparatus for operating a flashlight using a light emitting diode as a primary light source. The flashlight takes the form of a relatively small size, generally flat housing having metallic side panels that may be of various colors and have indicia printed on them. The housing has an integral keyring extension enabling an article to be attached to the flashlight or for the flashlight to be attached to other articles, such as the clothing of a user.

SUMMARY OF THE INVENTION

It is therefore an object of the invention to provide a method for producing a fob formed of plastics material having a casing and resilient clip that overhangs the casing that is formed as a composite injection molded structure.

This object is realized in accordance with one embodiment of the invention by a method for producing a fob formed of plastics material having a casing and resilient clip that overhangs the casing that are formed as a composite injection molded structure, the method comprising:

injecting molten plastics into an injection mold having a first hollow corresponding to the casing and which abuts a second hollow corresponding to the clip, the second hollow having an open contour that abuts the first hollow at a first end and at all other locations lies outside a boundary of the first hollow;

removing the plastics from the mold after molding is complete thus obtaining an injection molded unit having a casing and a resilient clip abutting the casing at a first end of the clip while lying outside a boundary of the casing; and applying local heat to the clip and bending the clip so that it overhangs the casing.

According to another embodiment of the invention there is provided an injection molded fob having a casing and a resilient clip abutting the casing at a first end of the clip and overhanging the casing to form a substantially J-shaped clip.

In one embodiment, the fob's casing accommodates a PCB, and has a peripheral recess that accommodates a cover that serves to seal and protect the PCB.

BRIEF DESCRIPTION OF THE DRAWINGS

In order to understand the invention and to see how it may be carried out in practice, an embodiment will now be described, by way of non-limiting example only, with reference to the accompanying drawings, in which.

DETAILED DESCRIPTION OF EMBODIMENTS

Figure 1:
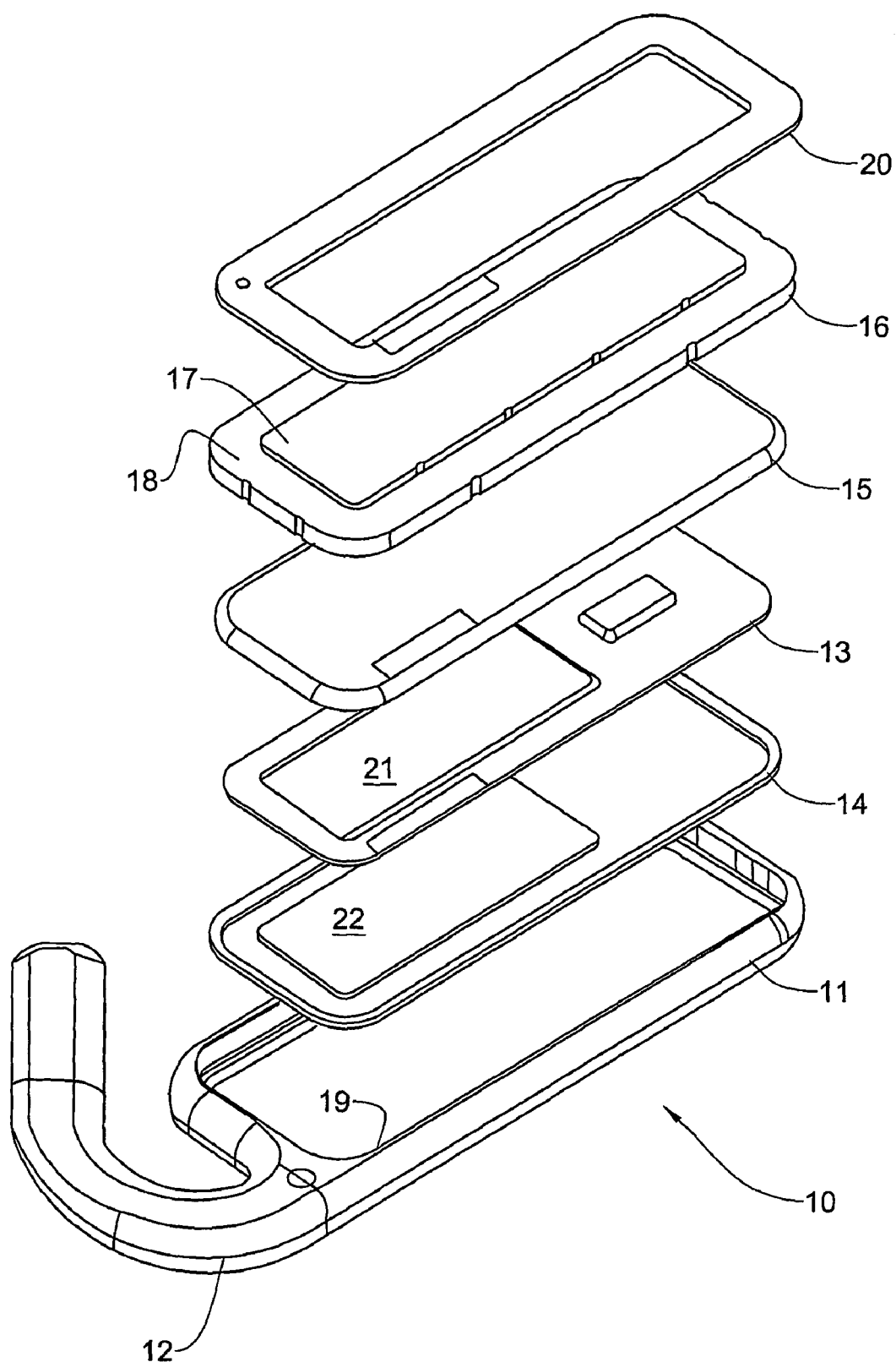
FIG. 1 shows pictorially an exploded view of a key fob in accordance with an embodiment of the invention.

FIG. 1 shows pictorially an exploded view of a key fob 10 in accordance with an embodiment of the invention having a hollow casing 11 and a clip 12 which abuts the casing at a first end of the clip while lying outside a boundary of the casing as defined by its contour. Owing to the fact that in its initial state, the casing 11 and the clip 12 do not overlap, they are formed as a composite injection molding.

Figure 2:
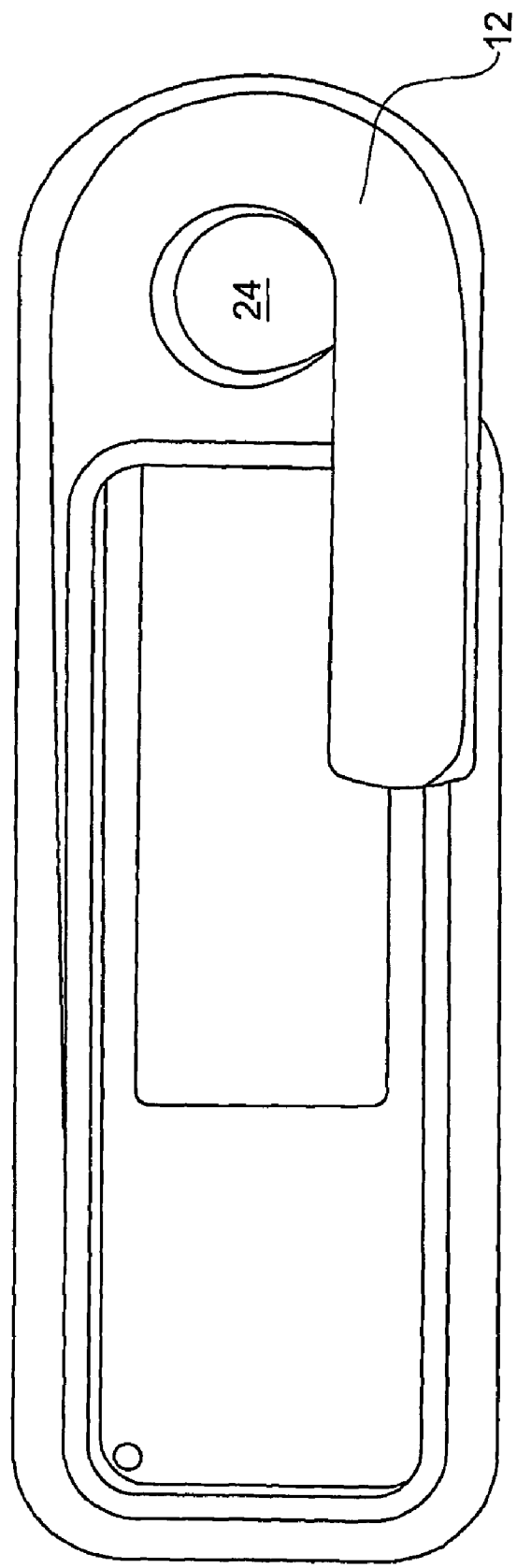
FIG. 2 shows pictorially the key fob in its final form.

In one embodiment of the invention, the key fob contains an electronic circuit that is mounted on a PCB 13. To protect the electronic circuit the PCB 13 is mounted inside a tray or drawer 14 and covered by a lid 15. The drawer 14 and the lid 15 are likewise formed as injection molded units that in one embodiment snap fit together to form a fairly tight seal that protects the thus enclosed PCB 13. The resulting unit is placed inside the hollow casing 11 and further protection is provided by a cover 16 that fits inside the casing 11 on top of the unit containing the PCB 13 enclosed within the drawer 14 and lid 15. An upwardly depending protrusion 17 is disposed in the center of the cover 16 so as to leave a peripheral depression 18 around the cover 16. Components of the key fob are so dimensioned that, when assembled, the exposed surface of the protrusion 17 in the cover 16 is substantially flush with an upper rim 19 of the casing 11, leaving only a small peripheral recess around the upper rim 19 of the casing 11, corresponding to the depression. In order to provide an airtight seal, an overmold 20 in the form of an annular sheet of thermoplastics material is injection molded inside the casing so that it fills the recess and forms a completely sealed unit that is impervious to air and liquids. Finally, local heat is applied to the clip 12 while bending the clip until it overhangs the casing 11 as shown in final form in FIG. 2. By such means a resilient clip is formed that allows the key fob 10 to be inserted in a user's pocket, for example, and to be removably clipped onto a key ring.

In the particular embodiment shown in the figure, the PCB 13 is provided with an aperture 21 that engages a complementary protrusion 22 in the upper surface of the drawer 14 so as to secure the PCB 13 within the drawer and prevent it from moving. This allows the dimensions of the PCB 13 to be smaller than the internal dimensions of the drawer. It will be appreciated that a similar effect can be realized by a pair of protrusions or pins each adapted to engage complementary holes in the PCB 13.

Figure 3:
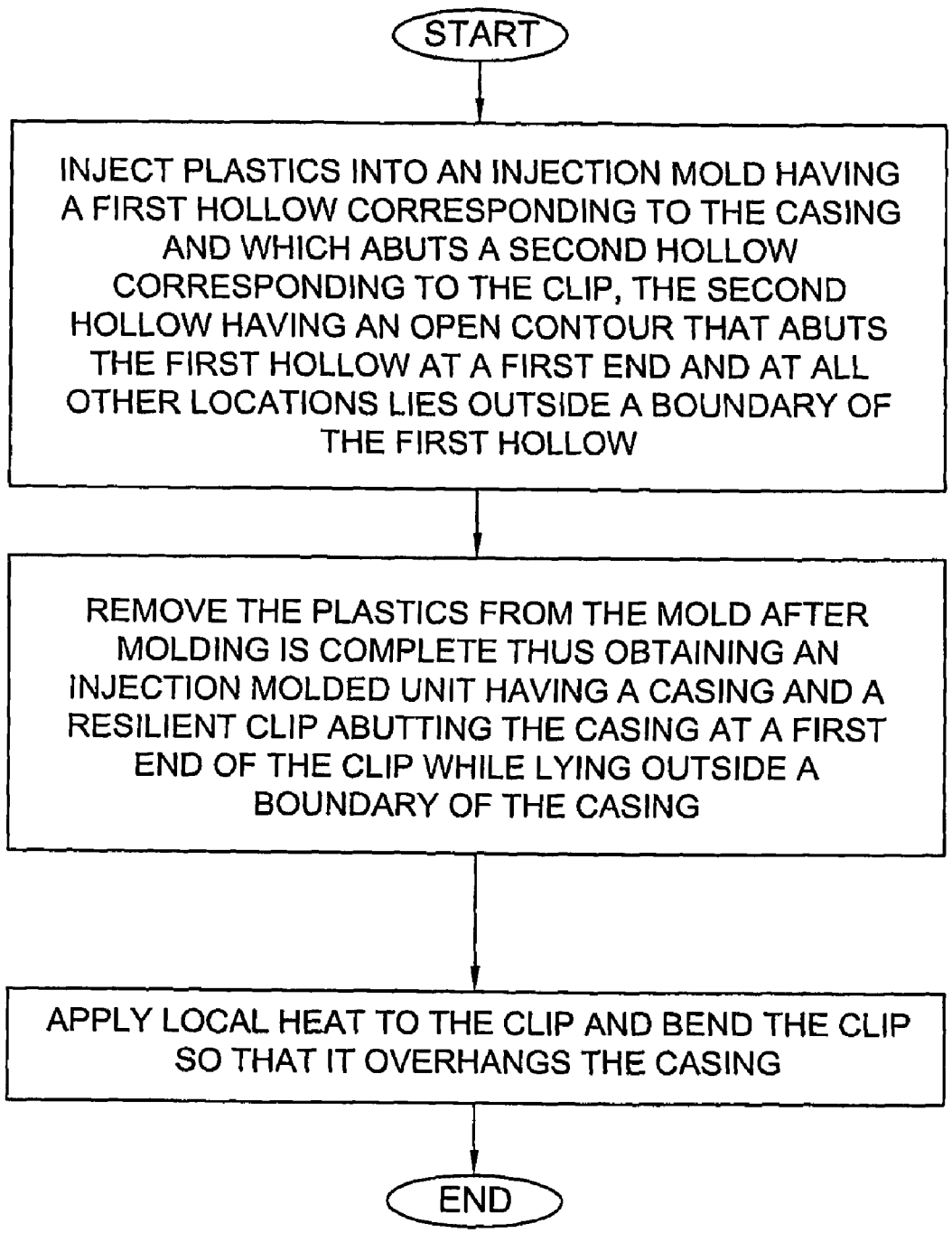
FIG. 3 is a flow diagram showing principal stages of manufacture of the key fob.

FIG. 3 summarizes the principal stages of manufacture of the key fob 10. Molten plastics are injected into an injection mold (not shown) having a first hollow corresponding to the casing and which abuts a second hollow corresponding to the clip, the second hollow having an open contour that abuts the first hollow at a first end and at all other locations lies outside a boundary of the first hollow. After molding is complete, the plastics is removed from the mold thus obtaining an injection molded unit having a casing and a resilient clip abutting the casing at a first end of the clip while lying outside a boundary of the casing. Local heat is then applied to the clip while bending the clip so that it overhangs the casing. It will be noted from FIG. 2, that in this position the clip 12 defines a central aperture that may serve to attach a key ring or other device.

It will be appreciated that modifications may be made to the key fob and to its method of manufacture without departing from the invention as claimed, which is particularly suited for a key fob that contains an electronics module that must be well protected against the elements. In the case, as described, where a watertight and airtight seal is formed by the overmold 20, there is no need for the drawer 14 containing the electronic circuit and the lid 15 to snap fit together. It is sufficient to assemble the various components as described, and to seal the resulting assembly hermetically using the overmold. According to an alternative embodiment, the overmold is discarded and a seal may then be formed around the upper rim 19 of the casing 11 using an ultrasonic sealing technique to melt the cover 16 and the inside surface of the casing 11 at their mutual boundaries. In either case, additional sealing may optionally be provided by configuring the drawer 14 and the lid 15 to snap fit together.

While an embodiment has been described with regard to a key fob that contains an electronic circuit, the invention is equally applicable to other fobs. Most generally, the invention is applicable to any fob that is formed by injection molding and is provided with a substantially J-shaped clip whose final configuration cannot be formed as part of the injection molding process. Thus, a fob according to the invention may be nothing than a key fob adapted to support one or more keys and having a clip that allows the key fob to be clipped to an article of clothing. It may also be a name badge, where a name tag is inserted into the casing prior to fitting the cover 16, which engages the upper rim 19 of the casing 11 and may snap fit thereto. Obviously in order that such a name tag will be visible either or both of the casing and the cover must be transparent.

The invention claimed is:

1. A method for producing a fob formed of plastics material having a casing and resilient clip that overhangs the casing that are formed as a composite injection molded structure, the method comprising:
    injecting molten plastics into an injection mold having a first hollow corresponding to the casing and which abuts a second hollow corresponding to the clip, the second hollow having an open contour that abuts the first hollow at a first end and at all other locations lies outside a boundary of the first hollow;
    removing the plastics from the mold after molding is complete thus obtaining an injection molded unit having a casing and a resilient clip abutting the casing at a first end of the clip while lying outside a boundary of the casing; and
    applying local heat to the clip and bending the clip so that it overhangs the casing.

2. The method according to claim 1, wherein the casing is substantially rectangular in shape and there is further included molding the casing so to have a recess for accommodating an insert therein.

3. The method according to claim 2, wherein the insert is a PCB and there is further included:
    inserting the PCB into the recess;
    inserting a plastic cover into the recess so as to overlay the PCB; and
    sealing between a peripheral edge of the plastic cover and a peripheral rim of the casing.

4. The method according to claim 3, wherein the insert is formed by:
    forming a drawer for accommodating the PCB;
    mounting the PCB inside the drawer;
    fitting a lid on the drawer.

5. The method according to claim 4, including forming complementary snap-fit connections on the drawer and the lid.

6. The method according to claim 3, wherein sealing between a peripheral edge of the plastic cover and a peripheral rim of the casing includes:
    injection molding a plastics overmold at high temperature over the plastic cover;
    whereby the plastics overmold fills the peripheral recess between the edge of the plastic cover and the rim of the casing.

7. A fob comprising:
    an injection molded unit having a casing, the casing having a planar surface; the fob having an elongated resilient clip molded integrally with the casing and abutting an edge of the casing at a first end of the clip so as to protrude out of the edge; the clip being bent backwards to form a curvature which starts at the edge and continues so that the clip overhangs the planar surface of the casing to form a substantially J-shaped clip that forms a ring between an internal surface of the clip and an outer surface of the casing.

8. The fob according to claim 7, wherein the casing is substantially rectangular in shape and includes a recess for accommodating an insert therein.

9. The fob according to claim 8, wherein the insert is a PCB and there is further included a plastic cover mounted within the recess so as to overlay the PCB and form a peripheral recess around an edge of the plastic cover.

10. The fob according to claim 9, wherein the insert includes:
    a drawer for accommodating the PCB; and
    a lid that fits on the drawer.

11. The fob according to claim 10, wherein the drawer and the lid are formed with a snap-fit connection.

12. The fob according to claim 9, further including a seal between a peripheral edge of the plastic cover and a peripheral rim of the casing.

* * * * *